United States Patent [19]

Belter

[11] Patent Number: 4,518,168
[45] Date of Patent: May 21, 1985

[54] MULTI-THICKNESS FIRE RING ASSEMBLY
[75] Inventor: Jerome G. Belter, Mt. Prospect, Ill.
[73] Assignee: Dana Corporation, Toledo, Ohio
[21] Appl. No.: 585,803
[22] Filed: Mar. 2, 1984
[51] Int. Cl.³ ............................................. F16J 15/12
[52] U.S. Cl. ............................. 277/235 B; 277/211; 277/215; 277/234
[58] Field of Search ........... 277/235 B, 235 R, 235 A, 277/207 R, 211, 213–215, 234

[56] References Cited

U.S. PATENT DOCUMENTS

| Des. 33,782 | 12/1900 | Merwarth et al. | |
|---|---|---|---|
| 323,731 | 8/1885 | Phillips . | |
| 923,890 | 6/1909 | Puffer . | |
| 1,843,297 | 2/1932 | Oven | 277/235 B X |
| 2,679,241 | 5/1954 | Dickson . | |
| 2,939,753 | 6/1960 | Schilling et al. | |
| 3,033,582 | 5/1962 | Creavey . | |
| 3,139,009 | 6/1964 | Harting . | |
| 3,209,659 | 10/1965 | Colwell . | |
| 3,432,177 | 3/1969 | Colwell . | |
| 3,532,349 | 10/1970 | Czernik . | |
| 3,586,338 | 6/1971 | Miklau et al. | |
| 3,656,769 | 4/1972 | Jelinek et al. | |
| 3,721,452 | 3/1973 | Black . | |
| 3,841,289 | 10/1974 | Meyers | 277/235 B X |
| 3,909,019 | 9/1975 | Leko . | |
| 4,121,846 | 10/1978 | Skrycki | 277/235 B X |
| 4,140,323 | 2/1979 | Jacobs . | |
| 4,285,527 | 8/1981 | Connely | 277/234 X |
| 4,369,980 | 1/1983 | Backlin | 277/235 B |

FOREIGN PATENT DOCUMENTS

| 95368 | 12/1923 | Austria | 277/211 |
|---|---|---|---|
| 1425524 | 3/1969 | Fed. Rep. of Germany | 277/235 B |
| 1923482 | 11/1970 | Fed. Rep. of Germany | 277/235 B |
| 2252483 | 3/1973 | Fed. Rep. of Germany | 277/211 |
| 1227402 | 3/1960 | France | 277/211 |
| 1389010 | 4/1975 | United Kingdom | 277/235 B |
| 2089907 | 6/1982 | United Kingdom | 277/235 B |
| 2097871 | 11/1982 | United Kingdom | 277/235 B |
| 2101239 | 1/1983 | United Kingdom | 277/235 B |

Primary Examiner—Robert S. Ward
Attorney, Agent, or Firm—Frank B. McDonald

[57] ABSTRACT

A fire ring assembly includes a unitary fire ring having a plurality of concentrically positioned body portions, each integrally joined to a radially adjacent portion by a radially extending bridge. Each body portion defines a pair of axially aligned, parallel load-bearing surfaces. In a preferred embodiment, at least one of the body portions accommodates a greater compression load per unit of axial distortion. The bridge includes an axially stepped annulus having a greater axial thickness immediately adjacent the body portion affording the greater compression load capacity.

7 Claims, 2 Drawing Figures

MULTI-THICKNESS FIRE RING ASSEMBLY

BACKGROUND OF THE INVENTION

This invention relates to fire ring systems having pluralities of load-bearing portions. More particularly, the invention relates to the use of distinct but integrally joined components designed to provide non-uniform distortion characteristics under given compression loads.

In prior art fire ring systems wherein multiple but separate load-bearing components are employed, a major source of difficulty lies in the achievement of proper relative location of the separate components with respect to one another under conditions of assembly line production. Another problem relates to distortion characteristics of the separate components when placed under loads, whether or not the components are joined together. In some instances, greater compression capacity is desired of one distinct portion or component than of another within a given fire ring system. Efforts at achieving greater compression loads per unit of axial distortion have heretofore been accomplished only through increases in physical thickness of the body portions or components having the greater capacities.

SUMMARY OF THE INVENTION

A fire ring assembly is disclosed and claimed herein which provides a system wherein a plurality of load-bearing body portions are rigidly fixed with respect to one another. The assembly also provides for the accommodation of a greater compression load per unit distortion in one or more of the body portions without need for increase in thickness of those portions.

In a preferred form, the fire ring assembly includes a unitary fire ring having a pair of integrally connected load-bearing body portions fixed concentrically with respect to one another. Each body portion defines a pair of parallel, axially aligned load-bearing surfaces. The two body portions have structurally distinct cross sections, but are joined together via a radially extending integral bridge. The bridge has an axially stepped cross section, wherein the portion of cross section having the greater axial thickness is immediately adjacent the body portion disposed for accommodating the greater compression load per unit distortion.

DETAILED DESCRIPTION OF PREFERRED EMBODIMENTS

Figure 1:
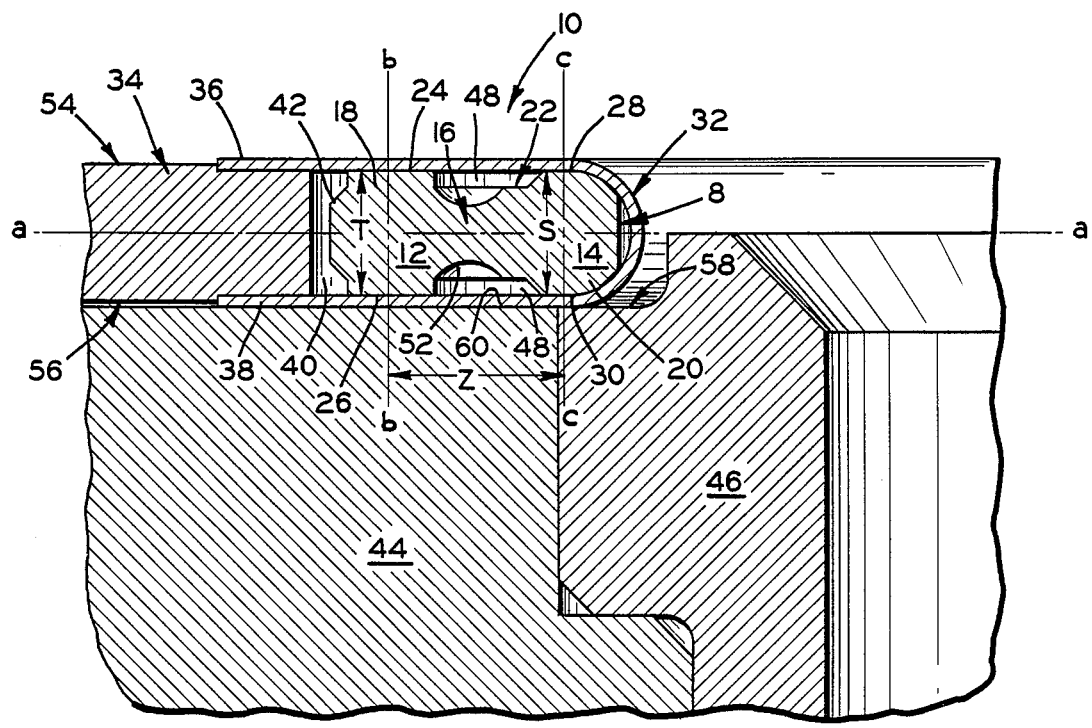
FIG. 1 is a cross sectional view of a preferred embodiment of the fire ring assembly of the present invention.

Referring first to FIG. 1, a fire ring assembly 10 includes a unitary fire ring 8 having first and second body portions 12 and 14. The body portions are annular in shape and are arranged in a concentric relationship, the body portion 14 having the smaller radius of the two. The two body portions are interconnected via an integral radially extending bridge 16, and each includes an upper and a lower load-bearing surface. Thus, the body portion 12 includes upper and lower parallel, axially alinged surfaces 24 and 26, while the body portion 14 includes parallel, axially aligned upper and lower surfaces 28 and 30.

The body portions 12 and 14 and the interconnecting integral bridge 16 preferably share a common symmetry about a radially disposed axis "a—a", about which the cross sectional view of FIG. 1 is taken. It will be noted that the bridge 16 is axially stepped, and includes a portion 22 of a greater axial thickness as will be explained hereinbelow. The body portion structures described are enshrouded by a thin, high heat resistant metallic cover or flange 32. The flange 32 defines upper and lower legs 36 and 38 which clasp tightly against the parallel load-bearing surfaces 24, 26, 28, 30, and which secure the fire ring assembly to opposing upper and lower faces 54 and 56 of a cylinder head gasket body 34 as shown.

It will thus be appreciated by those skilled in the art that the fire ring assembly 10 is designed for sealing the combustion chamber of a typical internal combustion engine, and is thus disposed for being clamped between an engine block 44 and a cylinder head (not shown). The assembly as herein described is particularly suitable for combustion chamber applications wherein cylinder liners such as the liner 46 are employed, as further explained hereinbelow.

As noted, the bridge 16 which integrally joins the body portions 12 and 14 is stepped, having a portion 22 of greater axial thickness relative to an adjacent necked down portion 52. In some applications, it is desirable that a lesser unit distortion be realized for a given amount of compression load as applied over one body portion than another. This difference will result in one body portion being distorted more readily than another under given loadings. In the preferred embodiment as shown, the portion 22 having the greater axial thickness acts to make the adjacent body portion 14 crush or collapse less readily when identical loads are applied over both portions 12 and 14.

The latter phenomenon occurs because the portion 14 is more resistant to distortion by virtue of its proximity to the portion 22 which has a greater mass than the necked down portion 52. This concept is most apparent when the relative cross-sections of the body portions 12 and 14 are essentially identical as they are in the preferred embodiment shown. Those skilled in the art will realize this invention therefore provides a tremendous flexibility to the design of fire ring assemblies having components wherein non-uniform distortion characteristics are desired. In the case of the present invention, the relative axial thicknesses "T" and "S" are identical prior to claimping the assembly 10 into place, whereas without the use of an adjacent greater mass portion 22 the axial dimension "S" of the body portion 14 would have to be greater than the axial thickness "T" to effect a greater compression load per unit axial distortion.

In the embodiment shown, it will also be noted that the dimension "Z", the distance between the vertical axes "b" and "c" of the respective load-bearing surfaces 24,26 and 28,30 may be varied for flexibility of the application as desired. Thus for example, where a cylinder liner 46 is utilized, the distance "Z" may be varied to control the amount of surface overlay between the block 44 and liner 46, particularly where the liner ledge 58 is narrow as in FIG. 1 (compared with FIG. 2). Even in such applications, it is desirable that the gasket assembly 10 transmit some load to the liner 46 to prevent it from moving during the dynamic operation of the engine. Control of the compression load capacity with respect to the amount of overlay can thereby conveniently be varied in critical applications, such as where centrifically cast iron liners are employed in aluminum blocks, or where relatively thin-walled liners are utilized. In such cases, undue loads must be carefully avoided to ensure that the liner does not crack, or even that the liner bore does not distort. Incidentally, in cases where the ledge 58 of the cylinder liner 46 extends above or below the top surface 60 of the engine block 44, the thicknesses "T" and "S" would not be identical, but would have relative dimensions relfecting the offset between the ledge 58 and surface 60. The "distortion" concept would not be violated thereby, and such embodiment would remain within the scope of this invention.

In the preferred embodiment, a void or space 40 exists between the first body portion 12 of the assembly 10 and the gasket body 34. It is desirable that this space be eliminated upon the crushing or collapse of the adjacent portion 12 upon torquing of the cylinder head to the engine block 44. In some cases, it will be desirable to include an embossment 42 which extends from the portion 12 partially into the space 40 to ensure that the same becomes entirely filled with plastically deformed metal. (It should be noted that both FIGS. 1 and 2 depict fire ring assembly configurations prior to torquing of cylinder head to engine block.)

Figure 2:
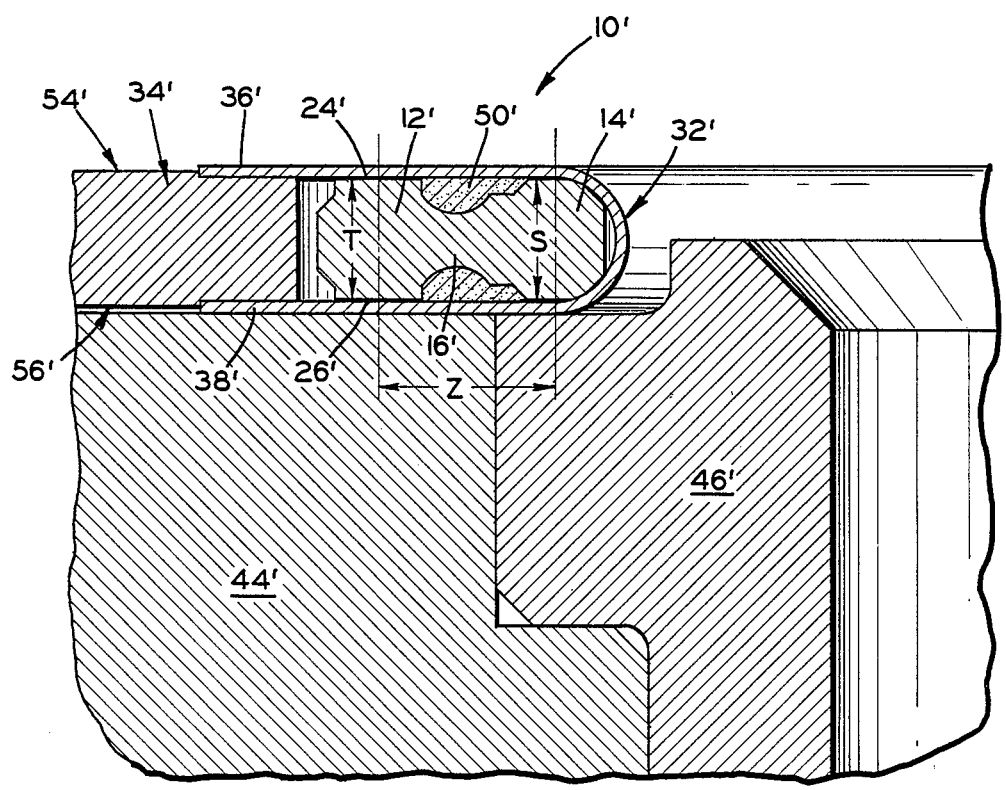
FIG. 2 is a second preferred embodiment of the fire ring assembly of the present invention.

Referring now to FIG. 2, a second preferred embodiment of a fire ring assembly 10' is shown, wherein graphite masses 50' are utilized in the otherwise void cavities 48 (FIG. 1) bounded by the spaces between the bridge 16' and the flange legs 36' and 38'. The addition of a graphite, or alternately of a high temperature elastomer material, as a filler in this otherwise void space has been found to desirably increase the rate of heat transfer from the fire ring. In addition, the loading gradient between the higher and lower compression body portions is thereby made more gradual, and thus a more desirable surface conformability of the thin metallic flange 32 is achieved. (If desired, a thin film of the filler may also be applied to the surfaces 24,26,28, and 30).

Finally, the fire ring assembly of the present invention is preferably formed of a ductile metal in either a metal stamping device or a progressive die, depending on the hardness of the metal employed. In a preferred form, the unitary fire ring 8 is made of SAE 1008/1010 steel, annealed after fabrication to approximately 35 Rb. Alternatively, the ring 8 may be made of aluminum alloys, annealed stainless steels, or even powdered metals.

As herein described, the asembly 10,10' provides a unique combustion sealing device, having a plurality of fire ring body portions with distinct compression load capacities. As such, the assembly represents a valued improvement over the prior art, and although described in only two embodiments herein, will have other variations which fall within the scope of the appended claims.

What is claimed is:

1. In a fire ring assembly comprising a unitary fire ring having a plurality of concentrically positioned body portions, each portion integrally joined to a radially adjacent body portion by a radially extending bridge, each body portion comprising a pair of axially aligned, parallel load-bearing surfaces, one of said body portions accommodating a greater compression load per unit of axial distortion than an adjacent body portion; an improvement comprising said bridge defining an axially stepped annulus having a greater thickness immediately adjacent the body portion disposed for accommodating said greater compression load.

2. The fire ring assembly of claim 1 wherein said fire ring body portions are externally enshrouded by a steel cover.

3. The fire ring assembly of claim 2 wherein all spaces axially opposed of said bridge and between said steel cover are filled with graphite.

4. The fire ring assembly of claim 3 wherein said steel cover extends radially outwardly of said fire ring body portions to define a pair of flanges disposed for gripping a gasket body.

5. The fire ring assembly of claim 4 wherein said body portions and said bridge are comprised of a ductile metal.

6. The fire ring assembly of claim 5 further comprising an embossment on a body portion most adjacent said gasket body.

7. The fire ring assembly of claim 6 wherein said body portion disposed for accommodating said greater compression load is disposed radially inwardly of said adjacent body portion.

* * * * *